(12) United States Patent
Dufendach et al.

(10) Patent No.: US 10,682,906 B2
(45) Date of Patent: Jun. 16, 2020

(54) CONNECTOR SYSTEM FOR FUEL HOSE AND FILLER PIPE

(71) Applicant: Stant USA Corp., Connersville, IN (US)

(72) Inventors: Darl Dufendach, Kokomo, IN (US); Michael S. Brock, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 804 days.

(21) Appl. No.: 14/926,701

(22) Filed: Oct. 29, 2015

(65) Prior Publication Data

US 2016/0121715 A1  May 5, 2016

Related U.S. Application Data

(60) Provisional application No. 62/072,219, filed on Oct. 29, 2014.

(51) Int. Cl.
  *B60K 15/04*  (2006.01)

(52) U.S. Cl.
  CPC ........ *B60K 15/04* (2013.01); *B60K 2015/047* (2013.01); *B60K 2015/0464* (2013.01)

(58) Field of Classification Search
  CPC .. F16L 33/00; F16L 33/18; B60K 2015/0464; B60K 2015/047

USPC ........ 285/18, 239, 242, 248, 252, 256, 337, 285/345

See application file for complete search history.

(56) References Cited

U.S. PATENT DOCUMENTS

| | | | |
|---|---|---|---|
| 4,589,688 A * | 5/1986 | Johnson | E03C 1/0403 285/12 |
| 5,215,339 A * | 6/1993 | Morse | F16L 33/02 285/256 |
| 5,568,828 A | 10/1996 | Harris | |
| 6,056,029 A | 5/2000 | Devall et al. | |
| 6,386,244 B2 | 5/2002 | Brown et al. | |
| 6,568,714 B2 * | 5/2003 | Stripe | F16L 33/04 285/239 |
| 7,147,001 B2 | 12/2006 | Gamble | |
| 8,701,694 B2 | 4/2014 | Doble et al. | |
| 9,022,053 B2 | 5/2015 | Doble et al. | |
| 2004/0201217 A1 * | 10/2004 | Mobley | F16L 11/127 285/417 |
| 2011/0284126 A1 | 11/2011 | Gamble et al. | |
| 2012/0228292 A1 | 9/2012 | Doble et al. | |

* cited by examiner

*Primary Examiner* — Anna M Momper
*Assistant Examiner* — Fannie C Kee
(74) *Attorney, Agent, or Firm* — Barnes & Thornburg LLP

(57) ABSTRACT

A fuel tank fill assembly is adapted to be coupled to a fuel tank to conduct fuel from a fuel nozzle to the fuel tank during fueling of a vehicle. The fuel tank fill assembly illustratively includes a relatively rigid filler pipe and a relatively flexible fuel hose that cooperate to provide a conduit for conveying fuel.

19 Claims, 4 Drawing Sheets

Figure 3:
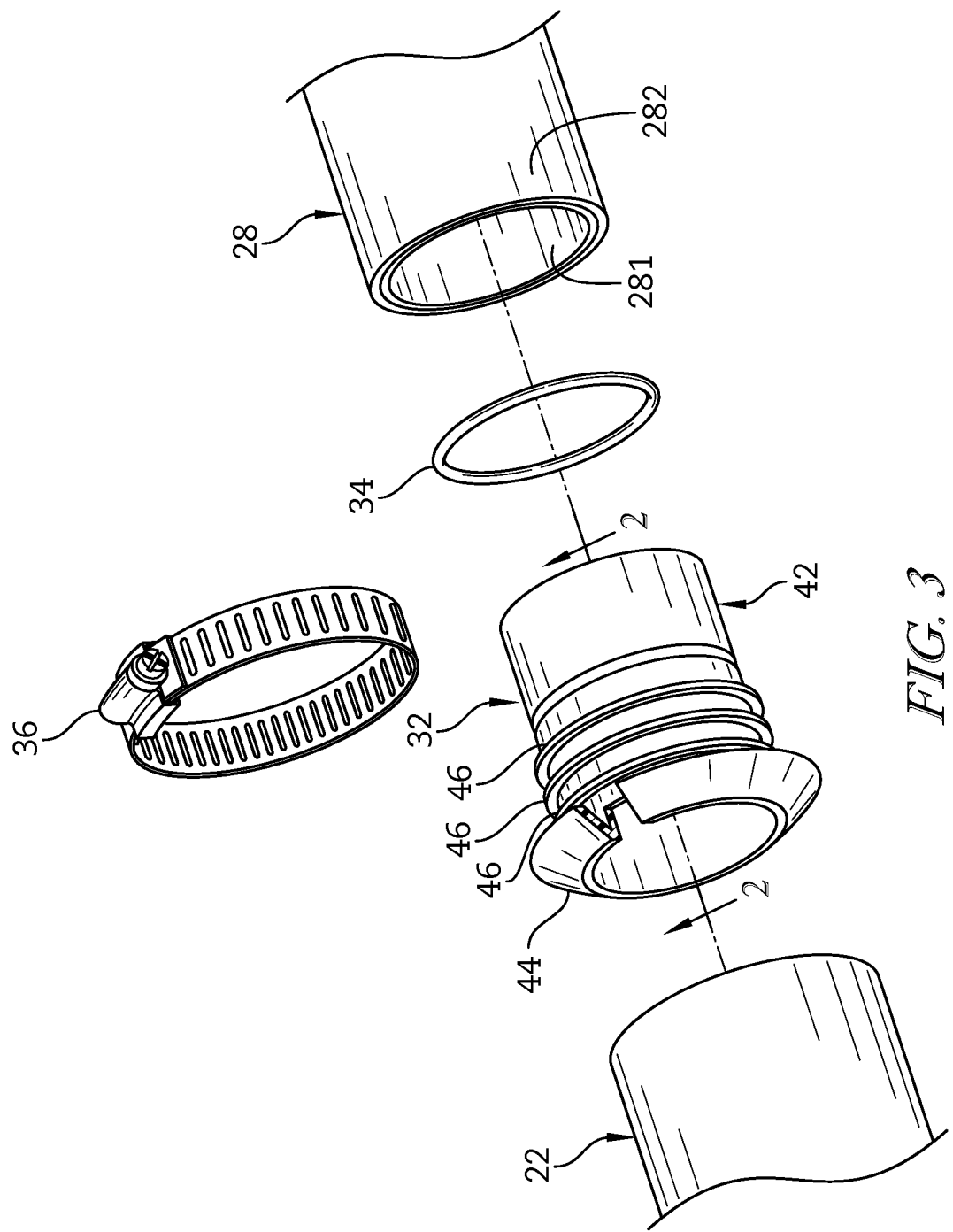

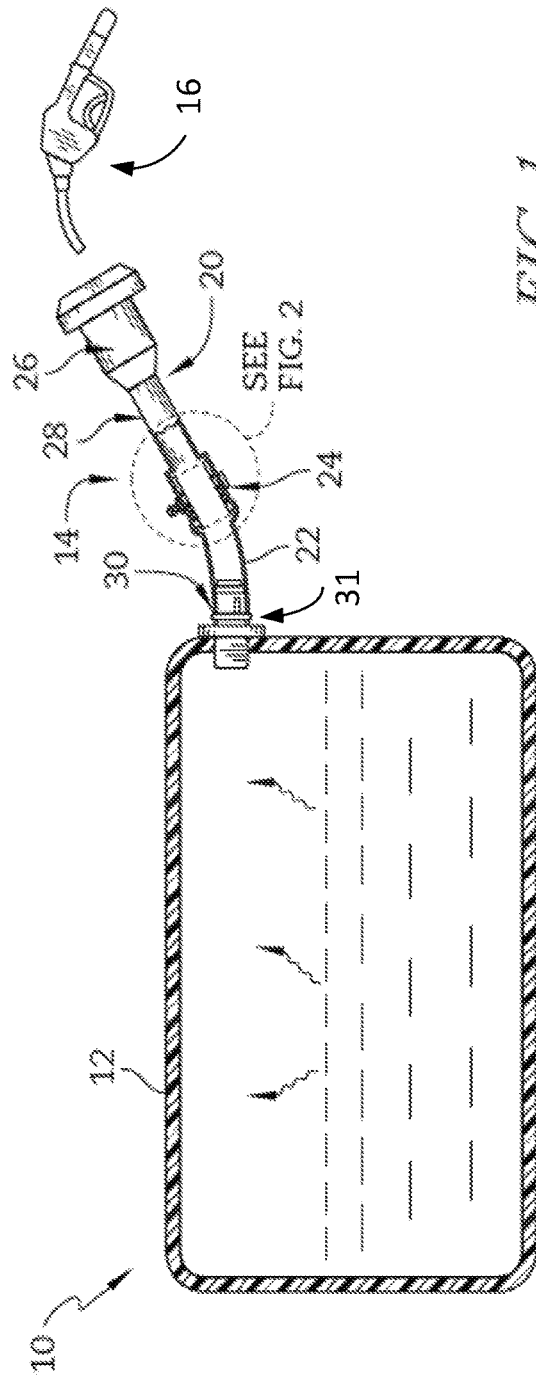
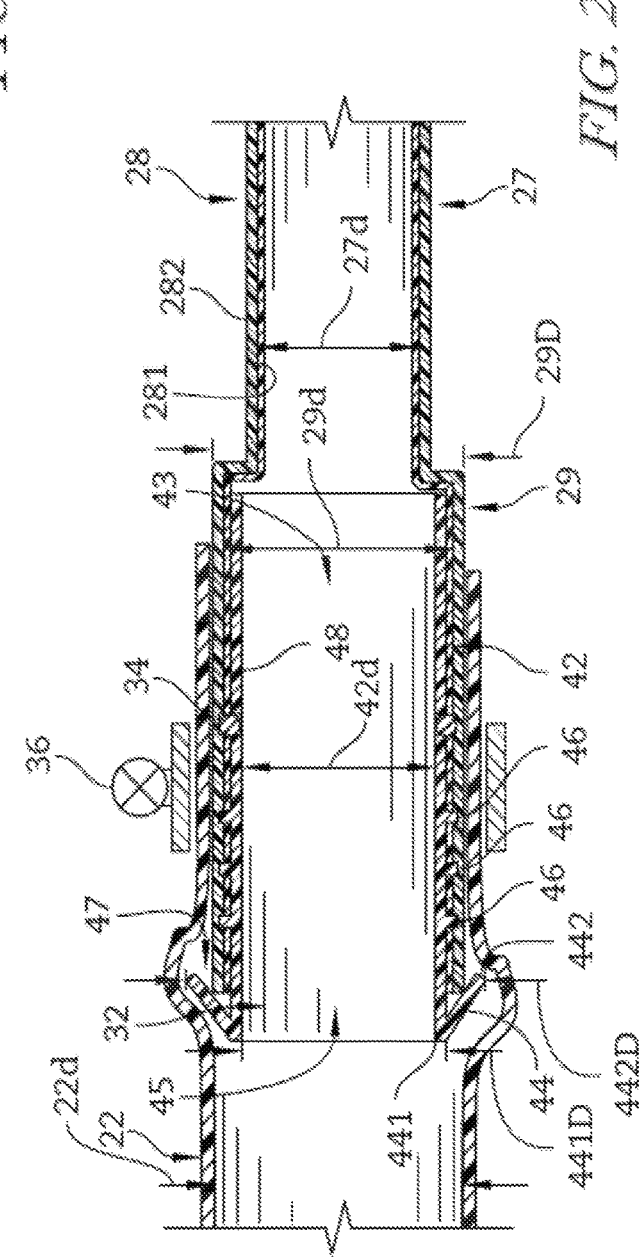

CONNECTOR SYSTEM FOR FUEL HOSE AND FILLER PIPE

PRIORITY CLAIM

This application claims priority under 35 U.S.C. § 119(e) to U.S. Provisional Application Ser. No. 62/072,219, filed Oct. 29, 2014, which is expressly incorporated by reference herein.

BACKGROUND

The present disclosure relates to fuel systems, and particularly to fuel systems that include fuel hoses and filler pipes. More particularly, the present disclosure relates to a connector system for coupling fuel hoses to filler pipes such that fuel flowing from the filler pipe to the fuel hose is contained at the junction of the fuel hose with the filler pipe.

SUMMARY

According to the present disclosure, a fuel tank fill assembly is coupled to a fuel tank to conduct fuel from a fuel nozzle to the fuel tank during fueling of a vehicle. The fuel tank fill assembly illustratively includes a relatively rigid filler pipe and a relatively flexible fuel hose that cooperate to provide a conduit for conveying fuel.

In illustrative embodiments, the fuel hose extends over a portion of the filler pipe and is coupled to the filler pipe by a connector system included in the fuel tank fill assembly. The connector system facilitates insertion of the filler pipe into the fuel hose and maintains a liquid-tight and vapor-tight seal between the filler pipe and the fuel hose so that hydrocarbons are contained in the fuel tank fill assembly and are not allowed to escape into the environment during fueling. The liquid-tight and vapor-tight seal is created by sealing against an inner layer of the filler pipe without welding or otherwise creating a permeable joint between the filler pipe and the fuel hose.

In illustrative embodiments, the connector system includes a hose insert, an O-ring seal, and a hose clamp. The hose insert is pressed into the filler pipe along an insert-receiving portion of the filler pipe that is inserted into the fuel hose. The O-ring seal is arranged between the hose insert outer diameter and the filler pipe inner diameter and blocks flow through the filler pipe around the hose insert. The hose clamp is arranged around the fuel hose along the insert-receiving portion of the filler pipe inserted into the fuel hose.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 4:
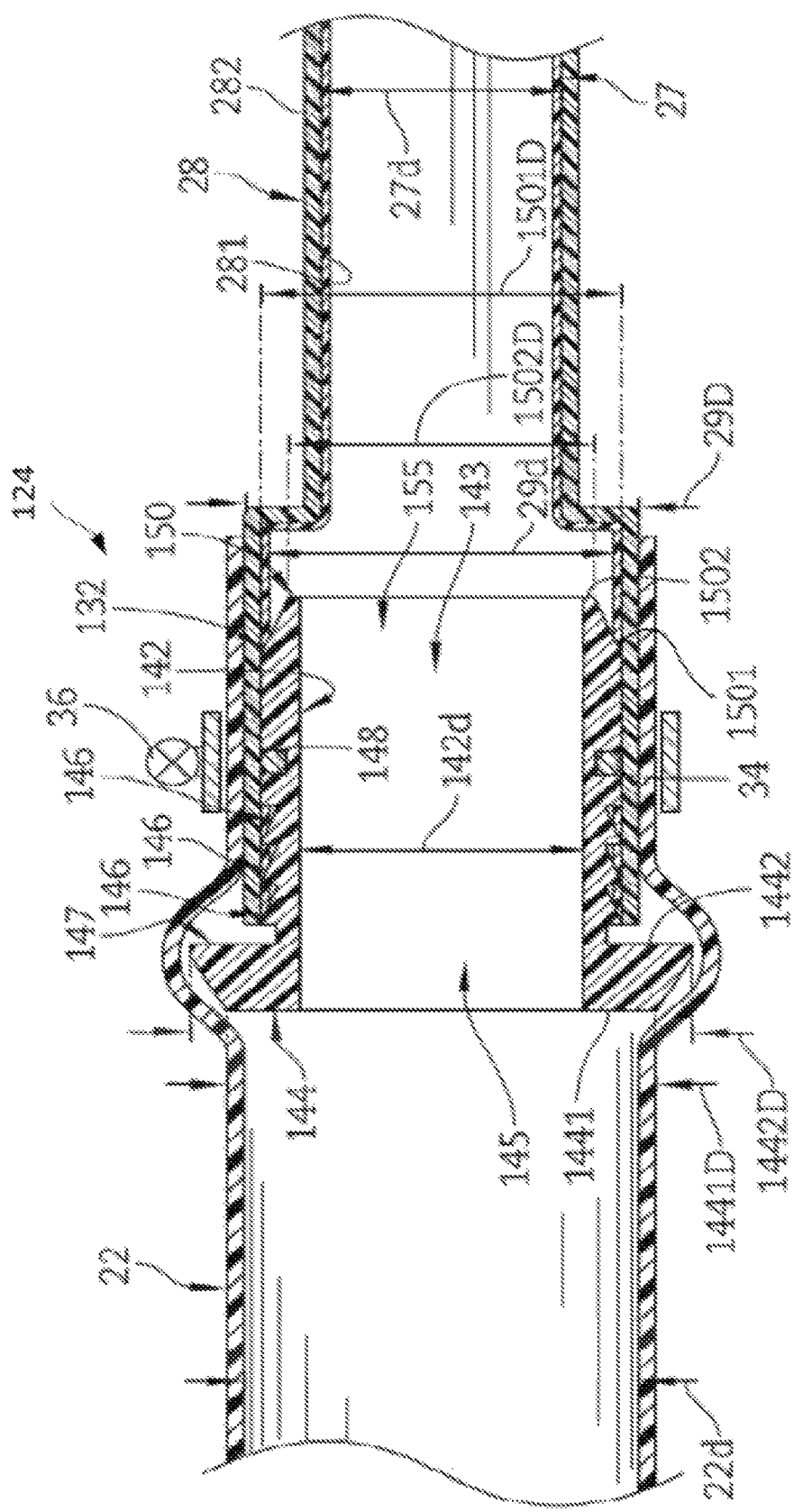
Figure 5:
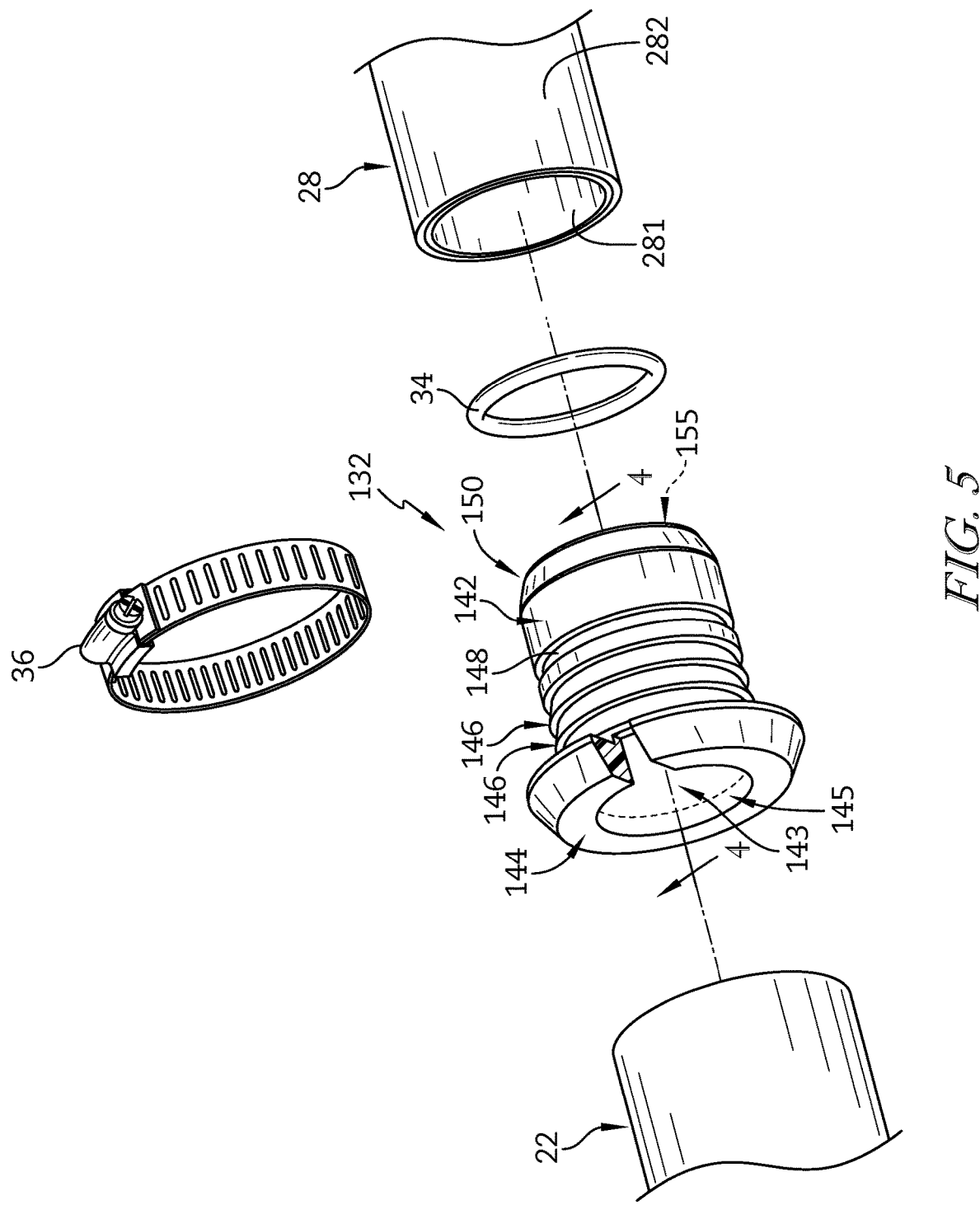

The detailed description particularly refers to the accompanying figures in which:

FIG. 1 is a side elevation view of a fuel system including a fuel tank and a fuel tank fill assembly showing that the fuel tank fill assembly includes a filler pipe that extends from an inlet cup, a fuel hose that extends from the filler pipe to an inlet check valve mounted to the fuel tank, and a connector system coupled between the filler pipe and the fuel hose to maintain a seal at the junction of the filler pipe with the fuel hose;

FIG. 2 is a detail cross-sectional view of a portion of FIG. 1 showing that the connector system includes a hose insert pressed into the filler pipe along a portion of the filler pipe inserted into the fuel hose, an O-ring seal arranged between the insert and the filler pipe, and a hose clamp arranged around the fuel hose along the portion of the filler pipe inserted into the fuel hose;

FIG. 3 is an exploded assembly view of the fuel tank fill assembly of FIG. 1 showing that the hose insert is formed to include a chamfered head adapted to facilitate insertion of the filler pipe into the fuel hose, a plurality of sealing barbs adapted to engage the filler pipe, and a seal groove for holding the O-ring seal of the connector system in place along the hose insert to seal between the hose insert and the filler pipe;

FIG. 4 is a detail cross-sectional view of a portion of another fuel tank fill assembly adapted for use in the fuel system of FIG. 1 showing that the fuel tank fill assembly includes a connector system for coupling a filler pipe to a fuel hose and showing that the connector system includes a hose insert pressed into the filler pipe along a portion of the filler pipe inserted into the fuel hose, an O-ring seal arranged between the insert and the filler pipe, and a hose clamp arranged around the fuel hose along the portion of the filler pipe inserted into the fuel hose; and FIG. 5 is an exploded assembly view of the fuel connection system shown in FIG. 4 showing that the hose insert is formed to include a chamfered tail adapted to facilitate press insertion of the hose insert into the filler pipe, a chamfered head adapted to facilitate insertion of the filler pipe into the fuel hose, a plurality of sealing barbs adapted to engage the filler pipe, and a seal groove for holding the O-ring seal of the connector system in place along the hose insert to seal between the hose insert and the filler pipe.

DETAILED DESCRIPTION

A fuel system 10 for use with a vehicle is shown in FIG. 1. Fuel system 10 includes a fuel tank 12 and a fuel tank fill assembly 14 coupled to the fuel tank 12. The fuel tank fill assembly 14 is adapted to conduct fuel from a fuel nozzle 16 to the fuel tank 12 during fueling of a vehicle.

The fuel tank fill assembly 14 illustratively includes a filler neck 20, a fuel hose 22, and a connector system 24 as shown in FIG. 1. The filler neck 20 includes a mouth 26 and a filler pipe 28 that extends from the mouth 26 to conduct fuel from the fuel nozzle 16 to the fuel hose 22. The fuel hose 22 extends over a portion of the filler pipe 28 to the fuel tank 12 and is coupled to the fuel tank 12 by a fuel conductor 30 that allows fuel to enter the fuel tank 12 from the fuel hose 22. The connector system 24 is coupled between the filler pipe 28 and the fuel hose 22 to facilitate insertion of the filler pipe 28 into the fuel hose 22 and to maintain a liquid-tight and vapor-tight seal between the filler pipe 28 and the fuel hose 22. The seal between the filler pipe 28 and the fuel hose 22 is illustratively created by sealing against an inner layer 281 of the filler pipe 28 without welding or otherwise creating a permeable joint between the filler pipe 28 and the fuel hose 22 as shown in FIG. 2.

In the illustrative embodiment, the filler pipe 28 is a suction-blow-molded pipe including the inner layer 281 that provides a fluid and vapor impermeable barrier adapted to block the escape of hydrocarbons to the environment from fuel in the filler pipe 28 as suggested in FIG. 2. In other embodiments, the filler pipe 28 may be an extruded tube with or without layers as described herein. In the illustrative embodiment, the connector system 24 provides means for facilitating insertion of the filler pipe 28 into the fuel hose 22 and for maintaining a liquid-tight and vapor-tight seal between the filler pipe 28 and the fuel hose 22 by sealing against the inner layer 281 of the filler pipe 28 and connecting the filler pipe 28 to the fuel hose 22 (which is also made from a fluid and vapor impermeable material) without welding or otherwise creating a permeable joint between the filler pipe 28 and the fuel hose 22 so that hydrocarbons are contained in the fuel tank fill assembly 14 and are not allowed to escape into the environment as suggested in FIG. 2.

The connector system 24 illustratively includes a hose insert 32, an O-ring seal 34, and a hose clamp 36 as shown in FIGS. 2 and 3. The hose insert 32 is pressed into the filler pipe 28 along an insert-receiving portion 29 of the filler pipe 28 that is subsequently inserted into the fuel hose 22. The O-ring seal 34 is arranged between the hose insert 32 and the filler pipe 28 and blocks flow through the filler pipe 28 around the hose insert 32. The hose clamp 36 is arranged around the fuel hose 22 along the insert-receiving portion 29 of the filler pipe 28 inserted into the fuel hose 22.

In the illustrative embodiment, the insert-receiving portion 29 of the filler pipe 28 may have an inner diameter 29d greater than an inner diameter 27d defined by a fuel-conductor portion 27 of the filler pipe 28 that extends from the fuel hose 22 to the mouth 26 of the filler neck 20 as shown in FIG. 2.

The hose insert 32 is pressed into the filler pipe 28 to couple the hose insert 32 to the filler pipe 28 without damaging the inner layer 281 of the filler pipe 28 as shown in FIG. 2. The hose insert 32 illustratively includes a sleeve body 42, a chamfered head 44, and a plurality of sealing barbs 46. The sleeve body 42 is cylindrical with an inner diameter 42d that is about equal to the inner diameter 27d of the fuel-conductor portion 27 included in the filler pipe 28. The chamfered head 44 extends out of the filler pipe 28 and into the fuel hose 22. The sealing barbs 46 extend outwardly from the sleeve body 42 and engage the filler pipe 28 to retain the hose insert 32 in place within the filler pipe 28 and to block flow through the filler pipe 28 around the hose insert 32.

The chamfered head 44 included in the hose insert 32 illustratively provides means for facilitating insertion of the rigid filler pipe 28 into the flexible fuel hose 22 as suggested in FIG. 2. The chamfered head 44 of the hose insert 32 forms an interior passageway 45 that communicates with the passageway 43 of the sleeve body 42 and is illustratively sized to spread an inner diameter 22d of the fuel hose 22 when the insert-receiving portion 29 of the filler pipe 28 is pushed into the fuel hose 22 as suggested in FIG. 2. The chamfered head 44 includes a distal end 441 spaced from the sleeve body 42 with an outer diameter 441D smaller than an inner diameter 22d of the fuel hose 22. The chamfered head 44 also includes a proximal end 442 adjacent to the sleeve body 42 with an outer diameter 442D larger than an inner diameter 22d of the fuel hose 22.

In the illustrative embodiment, the outer diameter 442D of the proximal end 442 included in the chamfered head 44 is larger than an outer diameter 29D of the insert-receiving portion 29 of the filler pipe 28 as shown in FIG. 2. Accordingly, the chamfered head 44 provides a retention barb 47 that blocks withdrawal of the filler pipe 28 from the fuel hose 22.

The O-ring seal 34 seals between the filler pipe 28 and the fuel hose 22 as suggested in FIG. 2. A seal groove 48 extends into the sleeve body 42 and receives a portion of the O-ring seal 34 to locate the O-ring seal 34 along an outer diameter of the sleeve body 42. The O-ring seal 34 illustratively comprises fluouroelastomers such that the O-ring seal 34 is an FKM seal as defined in ASTM D1418. However, the O-ring seal 34 may be made from other fluorinated elastomers (e.g. FFKM, FEPM, etc.) or other suitable materials.

In the illustrative embodiment, the fuel hose 22 is relatively flexible while the filler pipe 28 is relatively rigid as suggested in FIGS. 1-3. The filler pipe 28 illustratively comprises high density polyethylene (HDPE) and is a suction-blow-molded pipe having a plurality of layers. The filler pipe 28 may be made by other processes or methods in other embodiments of the design. The inner layer 281 of the filler pipe 28 is arranged inward of an outer layer 282 that is thicker than the inner layer 281 and is a relatively thin polyarylamide (PARA) layer adapted to block permeation of hydrocarbons from fuel and fuel vapor in the filler pipe 28. In other blow-molded or extruded embodiments, the inner layer can be any processible resin able to withstand direct fuel contact and serve as a hydrocarbon permeation barrier.

In some embodiments, the filler pipe 28 may be formed to include an optional hose retention barb at an open end of the insert-receiving portion 29. The hose retention barb may engage the fuel hose 22 to retain the fuel hose 22 in place relative to the filler pipe 28 when the fuel tank fill assembly 14 is assembled.

Another hose insert 132 adapted for used in a connector system 124 is shown in FIGS. 4 and 5. The hose insert 132, along with the O-ring seal 34 and the hose clamp 36, may cooperate to facilitate insertion of the filler pipe 28 into the fuel hose 22 and to maintain a liquid-tight and vapor-tight seal between the filler pipe 28 and the fuel hose 22 as shown in FIG. 4. The seal between the filler pipe 28 and the fuel hose 22 is illustratively created by sealing against the inner layer 281 of the filler pipe 28 without welding or otherwise creating a permeable joint between the filler pipe 28 and the fuel hose 22.

The hose insert 132 is adapted to be pressed into the filler pipe 28 to couple the hose insert 132 to the filler pipe 28 without damaging the inner layer 281 of the filler pipe 28 as suggested in FIGS. 4 and 5. The hose insert 132 includes a sleeve body 142, a chamfered head 144, a plurality of sealing barbs 146, a seal groove 148, and a chamfered tail 150. The sleeve body 142 is cylindrical with an inner diameter 142d that is about equal to the inner diameter 27d of the fuel-conductor portion 27 included in the filler pipe 28. The chamfered head 144 extends out of the filler pipe 28 and into the fuel hose 22. The sealing barbs 146 extend outwardly from the sleeve body 142 and are sized to engage the filler pipe 28 to retain the hose insert 132 in place within the filler pipe 28 and to block flow through the filler pipe 28 around the hose insert 132. The seal groove 148 extends into the sleeve body 142 and is sized to receive a portion of the O-ring seal 34 to locate the O-ring seal 34 along an outer diameter of the sleeve body 142. Chamfered tail 150 is sized to expand the filler pipe 28 upon pressing of the hose insert 132 into the filler pipe 28.

The chamfered head 144 of the hose insert 132 forms an interior passageway 145 that communicates with the passageway 143 of the sleeve body 142 as shown in FIG. 4. The chamfered head 144 is illustratively sized to spread an inner diameter 22d of the fuel hose 22 when the insert-receiving portion 29 of the filler pipe 28 is pushed into the fuel hose 22. The chamfered head 144 includes a distal end 1441 spaced from the sleeve body 142 with an outer diameter 1441D smaller than an inside diameter 22d of the fuel hose 22. The chamfered head 144 also includes a proximal end 1442 adjacent to the sleeve body 142 with an outer diameter 1442D larger than an inside diameter 22d of the fuel hose 22.

In the illustrative embodiment, the outer diameter 1442D of the proximal end 1442 included in the chamfered head 144 is larger than an outer diameter 29D of the insert-receiving portion 29 of the filler pipe 28 as suggested in FIG. 4. Accordingly, the chamfered head 144 provides a retention barb 147 that blocks withdrawal of the filler pipe 28 from the fuel hose 22.

The chamfered tail 150 of the hose insert 132 forms an interior passageway 155 that communicates with the passageway 143 of the sleeve body 142 as shown in FIGS. 4 and 5. The chamfered tail 150 is sized to spread the inner diameter 29d of the insert-receiving portion 29 of the filler pipe 28 when the hose insert 132 is pressed into the filler pipe 28. In the illustrative embodiment, the chamfered tail 150 includes a distal end 1501 spaced from the sleeve body 142 with an outer diameter 1501D larger than an inner diameter 27d of the fuel-conductor portion 27 included in the filler pipe 28. The chamfered tail 150 also includes a proximal end 1502 adjacent to the sleeve body 142 with an outer diameter 1502D larger than an inside diameter 27d of the fuel-conductor portion 27 included in the filler pipe 28. Accordingly, the chamfered tail 150 may be used to spread the filler pipe 28 when the hose insert 132 is pressed into the filler pipe 28 to form the insert-receiving portion 29 of the filler pipe 28.

The connector systems 24, 124 and the hose inserts 32, 132 are press-in, fuel-outlet sleeves for use with suction-blow-molded filler pipes such as filler pipe 28 shown in FIGS. 2-5 or with other filler pipes as described herein. The hose inserts 32, 132 /sleeve body 42, 142 seal against the thin inner layer (e.g. the fuel hydrocarbon permeation barrier) of filler pipe 28 without damaging it during installation. The hose insert 32, 132/sleeve body 42, 142 accommodates a reasonably large range of interference fit by expanding the filler pipe 28 during insertion. The OD (outside diameter) of seal barbs 46, 146 concentrate sealing pressure on the filler pipe's inner diameter 29d without damaging its thin inner layer.

Sealing performance may be further improved when hose clamp 36 pressure is applied as suggested in FIGS. 2 and 4. More specifically, the hose clamp 36 may be a band-type hose clamp that will tightly attach the fuel hose 22 to the filler pipe 28 around or just beyond the retention barb 47.

Due to revised CARB and EPA regulations reducing the amount of HC (hydrocarbon) permeation permitted from liquid and vaporized fuel in a vehicle fuel system (CARB Lev II to Lev III), all areas in a fuel tank fill assembly 14 vulnerable to HC permeation need to be minimized or eliminated. One method for terminating an HDPE (high-density polyethylene) filler pipe is to hot-plate weld the pipe's HDPE to another component with a HDPE weld interface. However, since HDPE alone is not a permeation barrier, some such welds may allow some degree of HC permeation.

The connector systems 24, 124 illustratively seal against a plastic filler pipe's permeation barrier layer 281 as shown in FIGS. 2 and 4. The connector system 24 also allows the permeation barrier layer 281 to continue along the hose insert 32 itself and into the flexible fuel hose 22 located between the filler pipe 28 and fuel conductor 30 which houses a fuel tank ICV (inlet check valve) 31.

The design of the connector systems 24, 124 may eliminate welding an adapter or quick-connect sleeve at the outlet of a plastic filler pipe 28. The connector system 24 maintains a continuous permeation barrier layer 281 from the filler pipe's 28 inside surface to the flexible fuel hose 22. This continuity may not be the case if a fuel hose is clamped to a filler pipe's HDPE outer shell. The connector systems 24, 124 may therefore maintain a gas and liquid-tight seal at the filler pipe's inside surface, even when the pipe's cross-sectional flow area is out of round or varies in size because it is formed only by air during the suction-blow-molding process. The connectors systems 24, 124 further are configured to maintain a gas and liquid-tight seal at the filler pipe's inside surface when the filler pipe is otherwise manufactured by extrusion or other suitable processes.

The connector systems 24, 124 illustratively include an hose insert 32, 132 (sometimes called a sleeve) with three rows of sealing barbs 46, 146, a groove 48, 148 for a sealing O-ring 34, and a retention (or sealing) barb/chamfered head 47, 147 for a flexible fuel hose 22 on its OD. The end of the sleeve 32, 132 may be pressed into a filler pipe 28 outlet. The hose insert 32, 132 may also have a relatively long, shallow-angle chamfer, which pre-locates the sleeve insert in the filler pipe 28 and acts as a conical-spreader or wedge as the sleeve 32, 132 is pressed into a fuel hose 22 with an interference fit.

The sleeve 32, 132 ID may be smooth and uninterrupted to maintain good fuel flow. The end of the sleeve 32, 132 may mate with a flexible fuel hose 22 and may have a molded feature with a lead taper 44, 144 and locking barb 47, 147 typically used for sealing to a fuel hose 22. The locking barb's 47, 147 shoulder may seat against the cut end of the filler pipe 28 when the sleeve 32, 132 is pressed into the pipe. When the fuel hose 22 is pushed over the sleeve 32, 132 and filler pipe 28, it may be clamped against the filler pipe 28 OD, but it may also capture the sleeve 32, 132 locking barb 47, 147, thereby preventing any axial migration of the sleeve 32, 132 from the filler pipe 28.

The illustrative connector systems 24, 124 may provide press-in installation using a conical spreader to reshape the filler pipe. A low-angle, conical chamfer tail 150 on the filler-pipe end of a hose insert 132 may permit easy centering on a filler pipe 28 outlet. As the hose insert 132 is pressed into a filler pipe 28, the chamfer tail 150 may spread and reshapes the pipe's interior surface to a cylindrical surface easily sealed by circular barbs and an O-ring. Insertion force may be relatively low for an insert (e.g. 32, 132) comprising polyoxymethylene (POM) (acetal), because the friction coefficient for POM dry-sliding against a filler pipe's PARA (or other suitable material) permeation layer is low. Consequently, the required insertion force may also be relatively low (force varies by degree of interference fit, which affects the sliding normal force).

The illustrative connector systems 24, 124 may provide for a permeation-barrier sealing interface at the interface between the filler pipe 28 and the fuel hose 22 as suggested in FIGS. 2 and 4. Since the hose insert 32, 132 sealing barbs 46, 146 and O-ring seal 34, 134 against a filler pipe's interior permeation barrier 281, there is no disruption of this barrier at the filler-pipe-to-fuel-hose interface.

The illustrative connector systems 24, 124 may provide a self-capturing, fuel-hose sealing barb as suggested in FIGS. 2 and 4. After the fuel hose 22 has been pushed into position and clamped to the filler pipe 28 OD the insert fuel-hose sealing barb 47, 147 is captured between the fuel hose 22 itself and the filler pipe 28 cut end to resist removal of the fuel hose 22. Accordingly, the fuel hose 22 may be captured by the hose insert 32, 132 of the connector system 24, 124.

The invention claimed is:

1. A fuel tank fill assembly adapted to be coupled to a fuel tank to conduct fuel from a fuel nozzle to the fuel tank during refueling, the fuel tank fill assembly comprising:
   a rigid filler pipe that provides a portion of a conduit adapted to conduct fuel from a fuel nozzle, the rigid filler pipe to include an outer layer and a vapor-impermeable inner layer,
   a flexible fuel hose comprising vapor-impermeable material that extends over a portion of the rigid filler pipe and is configured to be located between the rigid filler pipe and a fuel conductor which houses a fuel tank inlet check valve, the flexible fuel hose provides another portion of the conduit adapted to conduct fuel, and
   connector means for facilitating insertion of the rigid filler pipe into the flexible fuel hose and for maintaining a liquid-tight and vapor-tight seal between the filler pipe and the fuel hose by sealing against the inner layer of the filler pipe without welding or otherwise creating a permeable joint between the rigid filler pipe and the flexible fuel hose so that hydrocarbons are contained in the fuel tank fill assembly and are not allowed to escape into the environment when fuel is conducted through the conduit,
   wherein the connector means includes a hose insert that extends into an insert-receiving portion of the rigid filler pipe over which the flexible fuel hose extends and a hose clamp that extends around the flexible fuel hose along the insert-receiving portion of the rigid filler pipe,
   wherein the hose insert includes a cylindrical sleeve body located within the insert-receiving portion of the rigid filler pipe and a chamfered head that extends from the cylindrical sleeve body out of the rigid filler pipe and the chamfered head is sized to spread an inner diameter of the flexible fuel hose when the insert-receiving portion of the rigid filler pipe is pushed into the flexible fuel hose, and
   wherein the hose insert further includes a chamfered tail that extends from the cylindrical sleeve body opposite the chamfered head and the chamfered tail is sized to spread an inner diameter of the rigid filler pipe when the hose insert is pushed into the insert-receiving portion of the rigid filler pipe.

2. The fuel tank fill assembly of claim 1, wherein the chamfered head has a distal end having an inner diameter about equal to an inner diameter of the cylindrical sleeve body and an outer diameter greater than an outer diameter of the cylindrical sleeve body.

3. The fuel tank fill assembly of claim 1, wherein the hose insert includes the cylindrical sleeve body located within the insert-receiving portion of the rigid filler pipe and a plurality of sealing barbs that extend outwardly from the cylindrical sleeve body to engage an inner surface of the rigid filler pipe so that the hose insert is retained in the insert-receiving portion of the rigid filler pipe.

4. The fuel tank fill assembly of claim 3, wherein the hose clamp extends around at least a portion of one of the sealing barbs so that the hose clamp is configured to squeeze the rigid filler pipe into engagement with at least one of the sealing barbs when tightened.

5. The fuel tank fill assembly of claim 3, wherein the connector means includes an O-ring seal arranged around the hose insert to seal between the hose insert and the rigid filler pipe and the hose clamp extends around at least a portion of the O-ring seal so that the hose clamp is configured to squeeze the rigid filler pipe into engagement with the O-ring seal when tightened.

6. The fuel tank fill assembly of claim 5, wherein the inner layer of the rigid filler pipe is a polyarylamide layer adapted to block permeation of hydrocarbons from fuel and fuel vapor, and the O-ring seal comprises a fluorinated elastomer adapted to seal against the polyarylamide layer of the rigid filler pipe.

7. The fuel tank fill assembly of claim 1, wherein the hose insert includes the cylindrical sleeve body located within the insert-receiving portion of the rigid filler pipe, the cylindrical sleeve body is formed to include a seal groove that receives a portion of an O-ring seal to locate the O-ring seal along the cylindrical sleeve body, and the O-ring seal engages both the cylindrical sleeve body and the rigid filler pipe to seal between the cylindrical sleeve body and the filler pipe.

8. The fuel tank fill assembly of claim 7, wherein the inner layer is a polyarylamide layer adapted to block permeation of hydrocarbons from fuel and fuel vapor and the O-ring seal comprises a fluorinated elastomer adapted to seal against the polyarylamide layer of the rigid filler pipe.

9. A fuel tank fill assembly adapted to be coupled to a fuel tank to conduct fuel from a fuel nozzle to the fuel tank during refueling, the assembly comprising:
   a rigid filler pipe that provides a portion of a conduit adapted to conduct fuel, the rigid filler pipe formed to include an outer layer and a vapor-impermeable inner layer that is thinner than the outer layer,
   a flexible fuel hose that extends over a portion of the filler pipe and extends from the rigid filler pipe to a fuel tank inlet check valve, the flexible fuel hose providing another portion of the conduit adapted to conduct fuel, and
   a connector system including a hose insert that extends from inside of an insert-receiving portion of the rigid filler pipe into the flexible fuel hose and a hose clamp that extends around the flexible fuel hose along the insert-receiving portion of the rigid filler pipe, the hose insert formed to include passageways that couple for fluid communication between the portion of the conduit provided by the rigid filler pipe with the portion of the conduit provided by the flexible fuel hose, and the hose clamp configured to squeeze the flexible fuel hose onto the rigid filler pipe when tightened to seal the interface of the rigid filler pipe with the flexible fuel hose,
   wherein the connector system includes an O-ring seal arranged around the hose insert to seal between the hose insert and the rigid filler pipe and the hose insert is formed to include a seal groove that receives a portion of the O-ring seal to locate the O-ring seal along the hose insert.

10. The assembly of claim 9, wherein the inner layer of the rigid filler pipe is a polyarylamide layer adapted to block permeation of hydrocarbons from fuel and fuel vapor, and the O-ring seal comprises a fluorinated elastomer adapted to seal against the polyarylamide layer of the rigid filler pipe.

11. The assembly of claim 10, wherein the hose insert comprises polyoxymethylene adapted to slide relative to the polyarylamide layer of the rigid filler pipe so that the polyarylamide layer of the rigid filler pipe is not damaged during insertion of the hose insert into the rigid filler pipe.

12. The assembly of claim 9, wherein the hose insert includes a cylindrical sleeve body located within the insert-receiving portion of the rigid filler pipe and a plurality of sealing barbs that extend outwardly from the cylindrical sleeve body to engage an inner surface of the rigid filler pipe so that the hose insert is retained in the insert-receiving portion of the rigid filler pipe.

13. The assembly of claim 12, wherein the hose clamp extends around at least a portion of one of the sealing barbs so that the hose clamp is configured to squeeze the rigid filler pipe into engagement with at least one of the sealing barbs when tightened.

14. The assembly of claim 12, wherein the hose insert includes a chamfered head that extends from the cylindrical sleeve body out of the rigid filler pipe and a chamfered tail that extends from the cylindrical sleeve body further into the rigid filler pipe, the chamfered head is sized to spread an inner diameter of the flexible fuel hose when the insert-receiving portion of the rigid filler pipe is pushed into the flexible fuel hose, and the chamfered tail is sized to spread an inner diameter of the rigid filler pipe when the hose insert is pushed into the insert-receiving portion of the rigid filler pipe.

15. A fuel tank fill assembly adapted to be coupled to a fuel tank to conduct fuel from a fuel nozzle to the fuel tank during refueling, the assembly comprising:
  a rigid filler pipe that provides a portion of a conduit adapted to conduct fuel, the rigid filler pipe formed to include an outer layer and a vapor-impermeable inner layer that is thinner than the outer layer,
  a flexible fuel hose that extends over a portion of the filler pipe and extends from the rigid filler pipe to a fuel tank inlet check valve, the flexible fuel hose providing another portion of the conduit adapted to conduct fuel, and
  a connector system including a hose insert that extends from inside of an insert-receiving portion of the rigid filler pipe into the flexible fuel hose and a hose clamp that extends around the flexible fuel hose along the insert-receiving portion of the rigid filler pipe, the hose insert formed to include passageways that couple for fluid communication between the portion of the conduit provided by the rigid filler pipe with the portion of the conduit provided by the flexible fuel hose, and the hose clamp configured to squeeze the flexible fuel hose onto the rigid filler pipe when tightened to seal the interface of the rigid filler pipe with the flexible fuel hose,
  wherein the hose insert includes a cylindrical sleeve body located within the insert-receiving portion of the rigid filler pipe and a chamfered tail that extends from the cylindrical sleeve body further into the rigid filler pipe and the chamfered tail is sized to spread an inner diameter of the rigid filler pipe when the hose insert is pushed into the insert-receiving portion of the rigid filler pipe.

16. The assembly of claim 15, wherein the hose insert includes a chamfered head that extends from the cylindrical sleeve body out of the rigid filler pipe, the chamfered head is sized to spread an inner diameter of the flexible fuel hose when the insert-receiving portion of the rigid filler pipe is pushed into the flexible fuel hose, an outer diameter of the chamfered head is greater than the outer diameter of the chamfered tail, and the outer diameter of the chamfered head is greater than an outer diameter of the rigid filler pipe.

17. The assembly of claim 15, wherein the connector system includes an O-ring seal arranged around the hose insert to seal between the hose insert and the inner layer of the rigid filler pipe, the cylindrical sleeve body is formed to include a seal groove that receives a portion of the O-ring seal to locate the O-ring seal along the cylindrical sleeve body, and the O-ring seal is located by the seal groove along the hose insert between a plurality of sealing barbs and the chamfered tail.

18. The assembly of claim 15, wherein the hose insert includes the cylindrical sleeve body located within the insert-receiving portion of the rigid filler pipe and a plurality of sealing barbs that extend outwardly from the cylindrical sleeve body to engage an inner surface of the rigid filler pipe so that the hose insert is retained in the insert-receiving portion of the rigid filler pipe.

19. The assembly of claim 18, wherein the hose clamp extends around at least a portion of one of the sealing barbs so that the hose clamp is configured to squeeze the rigid filler pipe into engagement with at least one of the sealing barbs when tightened.

* * * * *